United States Patent [19]

Joly et al.

[11] Patent Number: 5,501,847
[45] Date of Patent: Mar. 26, 1996

[54] PROCESS FOR PURIFYING IMPURE SULPHURIC ACID

[75] Inventors: Jean-François Joly, Paris; Eric Benazzi, Montesson; Frédéric Chaigne, Valence; Jean-Yves Bernhard, Mennecy; Jean-Charles Viltard, Valence, all of France

[73] Assignee: Institut Francais Du Petrole, Rueil Malmaison, France

[21] Appl. No.: 369,482

[22] Filed: Jan. 6, 1995

[30] Foreign Application Priority Data

Jan. 6, 1994 [FR] France .................. 94 00145

[51] Int. Cl.$^6$ .................. C01B 17/90; C01B 17/74
[52] U.S. Cl. .................. 423/531; 423/525
[58] Field of Search .................. 423/524, 525, 423/526, 527, 528, 531

[56] References Cited

U.S. PATENT DOCUMENTS

| | | | |
|---|---|---|---|
| 2,110,267 | 3/1938 | Harrington et al. | 23/177 |
| 2,553,407 | 5/1951 | Epps, Jr. et al. | 423/527 |
| 2,992,070 | 7/1961 | Henley | 23/173 |
| 3,030,411 | 4/1962 | Leum et al. | 423/525 |
| 3,578,390 | 5/1971 | Kruel et al. | 423/525 |
| 3,677,701 | 7/1972 | Hollingsworth et al. | 423/531 |

FOREIGN PATENT DOCUMENTS

| | | | |
|---|---|---|---|
| 66990 | 9/1975 | Australia | 423/531 |
| 7403840 | 8/1974 | France . | |
| 9104113 | 10/1992 | France . | |

OTHER PUBLICATIONS

Derwent Publication Ltd., Database WPI, Week 8222, AN 82–44602E, JP-A-57 067 008, Apr. 23, 1982, abstract.

Primary Examiner—Gary P. Straub
Attorney, Agent, or Firm—Millen, White, Zelano, & Branigan

[57] ABSTRACT

The invention concerns a process for purifying sulphuric acid, particularly after it has acted as a catalyst in aliphatic alkylation reactions.

It is characterized in that the sulphuric acid is impregnated into a porous organic or inorganic support, for example silica, and is then calcined at least once to eliminate organic hydrocarbon substances which the sulphuric acid may contain.

9 Claims, No Drawings

PROCESS FOR PURIFYING IMPURE SULPHURIC ACID

The present invention concerns a novel process for eliminating organic hydrocarbon substances contained in impure sulphuric acid. It also concerns the treatment of the gaseous effluent resulting from elimination of the organic hydrocarbon substances.

The present invention particularly concerns a process for the treatment of used sulphuric acid resulting from the catalytic alkylation of isobutane and/or isopentane by means of an olefin to produce at least one product from the group constituted by dimethylbutanes, trimethylpentanes, trimethylhexanes and trimethylheptanes, for example.

A variety of chemical and petrochemical processes use sulphuric acid as a catalyst. This acid is generally recycled for as long as the concentration of impurities, in particular organic impurities, allows this. The sulphuric acid which is purged is thus relatively concentrated in organic material and is sent to a reprocessing plant. The only industrial reprocessing process for this discharged sulphuric acid is a process during which the acid is transformed by combustion into sulphur dioxide $SO_2$, followed by transformation into sulphur trioxide ($SO_3$) which is then transformed back into sulphuric acid by absorption in water. Examples of processes which produce impure sulphuric acid, often called sulphuric sludge, are the synthesis of alcohols from ethylene hydrocarbons (in particular the synthesis of ethanol from ethylene, isopropanol from propylene and 2-butanol from a mixture of 1-butene and 2-butene), the alkylation of isobutane by olefins such as propylene or butenes and purification of hydrocarbons in refining operations.

These processes, in particular alkylation, produce relatively small amounts of used acid which are currently considered to be too small to be treated on site. The product is thus sent to sulphuric acid production plants where it is reprocessed into pure sulphuric acid and returned to the alkylation unit. Frequently, the treatment units for sulphuric sludge are a long way from the site where the sludge is produced, entraining numerous risks as regards transport, generally by road, of a product which is as dangerous and polluting as the sulphuric sludge or the pure acid. This treatment comprises a first combustion step which transforms the acid into $SO_2$. In addition, the pure acid obtained is frequently more expensive than the fresh acid and the reprocessing plant will only reprocess if the supplier of the sludge takes back the pure acid, implying extra, non negligible costs for the alkylation plant.

A number of purification processes for used acid have been described. U.S. Pat. No. 3,652,708 describes a method for reducing the concentration of hydrocarbons in a residual acid by treatment with an excess of olefin before sending it to a combustion plant. This does not completely eliminate the problems mentioned above. The process described in European patent EP-B-0 052 548 uses nitric acid as an oxidizing agent for the organic hydrocarbon substances. This process involves treating the gases formed in a unit for eliminating nitrogen oxides, which represents an important drawback. The article by D. E. Shenfel'd et. al., in Zhurnal Prikaladnoi Khimii, Vol 61, No 7, pp 1550–1553, July 1988, describes a treatment process for a used acid by decomposing the acid in two steps. During the first step, carried out at a temperature of between 50° C. and 270° C., a solid black residue is formed which resembles coke. This residue, with a weight which substantially corresponds to the carbon content of the initial used acid, is then oxidised in the presence of a stream of air at a temperature of more than 400° C. During the first step, conversion of the organic hydrocarbon raw materials present in the initial used acid, measured from the quantity of oxides of carbon formed by reaction with the sulphuric acid, is about 12%. The process described in this document has the major drawback of producing a solid carbon-containing residue which requires oxidation in air at a very high temperature. French patent application registration number 92/02072 describes agents with an oxidizing power which is greater than that of the sulphuric acid, which are introduced into the used acid to be treated. Examples of such oxidizing agents are $H_2O_2$, $H_2SO_5$ and $H_2S_2O_8$. The use of these agents makes the process complex and expensive.

The process of the present invention eliminates the problems associated with the techniques used in the processes of the prior art and provides a solution which can be readily installed at the location where the sulphuric sludge is produced, in particular an alkylation unit.

The process of the present invention concerns a process for eliminating the organic hydrocarbon substances contained in an impure sulphuric acid solution which at this stage generally comprises about 50% to about 99.5% by weight of sulphuric acid and at least 0.1% by weight, expressed as the number of carbon atoms, of organic substances in their free or combined forms, characterised in that the impure sulphuric acid solution is impregnated into an organic or inorganic porous support, preferably silica.

According to the invention, the impure liquid sulphuric acid, which may have come from a sulphuric alkylation unit using liquid sulphuric acid as a catalyst, is in a first step impregnated into an organic or inorganic porous support, for example a silica, before being reprocessed in a second step as defined below.

The first step can be carried out using any technique which is known to the skilled person. Particularly when using silica as the impregnating support, the average diameter of the silica particles is generally between 0.1 and 400 microns (1 micron=$10^{-6}$ m).

Optionally, and in particular when the impregnation support is silica, the support can contain impurities such as oxides, alkalis, alkaline-earths, aluminium compounds or any other impurity which is known to the skilled person. The total quantity of impurities generally does not exceed 2% by weight with respect to the silica.

The silica may optionally be pretreated as follows:

The silica is calcined (or dried) at a temperature which is greater than 50° C., preferably greater than 80° C., and more preferably between 100° C. and 500° C., for example about 200° C. The duration of this calcining step is normally between 10 minutes and 50 hours. Calcining can be carried out in the presence of a gas containing molecular oxygen, for example air or an air/nitrogen mixture, at a flow rate of between 0.001 and 10 l/h/g. The calcined silica is then impregnated with the impure sulphuric acid solution as indicated above.

The treatment process for the impure acid contained in the silica pores comprises one or two stages. A single stage only can be carried out, depending on the chemical composition of the impure sulphuric acid to be treated.

In the first stage, the silica, impregnated with the impure acid, is calcined in a gas stream, for example a gas containing molecular oxygen, for example air or pure oxygen, at a flow rate of between 0.05 and 10 l/h/g of material to be treated, preferably between 0.1 and 5 l/h/g, at a temperature of between 100° C. and 400° C., preferably between 100° C. and 350° C., and more preferably between 170° C. and 330° C. The duration of the treatment is advantageously between a few minutes (for example, 3 minutes) and 8 hours.

In the second stage, the solid obtained at the end of the first stage is calcined in a gas stream, for example a gas containing molecular oxygen, for example air or pure oxygen, at a flow rate of between 0.05 and 10 l/h/g of material to be treated, at a temperature of between 400° C. and 600° C., preferably between 450° C. and 550° C., to eliminate the hydrocarbon deposits still present in the silica at the end of the first stage.

The first and second calcining stages produce a gaseous phase containing the products formed by oxidation of the hydrocarbon compounds initially present in the impure sulphuric acid and by oxidation of sulphur dioxide $SO_2$, and a condensable liquid phase constituted by purified sulphuric acid.

We have discovered that, surprisingly, during the second step, a large portion of the sulphuric acid contained in the silica is recovered in the first stage: the sulphuric acid is then condensed from the vapour leaving the tube reactor in which the first calcining stage of the invention is carried out. The condensed sulphuric acid is sufficiently pure for it to be used for the manufacture of an aliphatic alkylation catalyst, after mixing with an oleum such that the water content of the sulphuric acid solution thus prepared is less than about 2% by weight.

In addition, the calcined silica leaving the second step of the process of the invention can be impregnated again with sulphuric acid.

In the process of the invention, the gases formed during the second calcining step, in particular during the first stage of the second step, are frequently not discharged directly into the atmosphere both in order to make use of the products they contain and because of legislation concerning environmental protection. These gases are most often reduced to transform the major portion of the oxides of sulphur therein into sulphur. When the process of the present invention is used in a refinery, it integrates easily into the refinery and the sulphur dioxide formed can be sent to a CLAUS unit (fume treatment) which is nearly always present in this environment, in which it is reduced to sulphur and may then be transformed back into sulphur trioxide by oxidation.

The following example illustrates the invention without limiting its scope.

EXAMPLE 1

Reprocessing of impure sulphuric acid from an isobutane alkylation unit using olefins, using a liquid sulphuric acid catalyst.

10 g of a silica support with a total pore volume of 0.8 $cm^3/g$ was pretreated by calcining it in dry air at a flow rate of 5 l/h/g at 150° C. for 4 hours. The particle diameter of the silica was 110 μm (1 μm=$10^{-6}$ m). The dried silica was then impregnated with 7.5 $cm^3$ of sulphuric acid containing about 4.5% by weight of water and about 5.5% by weight of hydrocarbons (First process step).

The dried powder obtained was calcined in a flow of 24 l/h/g of dry air, at a temperature of 290° C., for 5 hours. The gases were cooled and the condensed liquid was collected in a flask (second process step).

After calcining, a liquid fraction was recovered which had a weight of 8.3 g, along with a dry powder with a weight of 10.57 g. The weight of the non condensed gases was 5.16 g.

The recovered liquid contained about 65% by weight of sulphuric acid, and the carbon-containing residue on the silica was completely eliminated by calcining in air at 550° C. for 4 hours.

The process of the invention recovered about 60% of the sulphuric acid initially present in the impure acid.

We claim:

1. A process for purifying an impure sulfuric acid solution by eliminating the hydrocarbon substances contained therein, said solution containing 50% to about 99.9% by weight of sulfuric acid and hydrocarbons substances in their free or combined forms, said process being characterized in that:
   a) the impure sulfuric acid is sorbed into a porous inorganic silica;
   b) said silica containing said sulfuric acid is then calcined at a temperature of between 100° C. and 400° C. in oxygen containing gas flow at to desorb off the sulfuric acid values while retaining hydrocarbons in the silica.

2. A process according to claim 1 wherein, following the calcining carried out in step b,
   c) the silica containing retained hydrocarbons is oxidatively calcined at a temperature of between 400° C. and 600° C. to eliminate the retained hydrocarbons in said support after said calcining stage of step b.

3. A process according to claim 1, wherein the silica, before impregnation with the impure sulfuric acid, is first pretreated by being calcined at a temperature of about 100°–500° C.

4. A process according to claim 3, wherein the pretreatment is carried out for a duration of between 10 minutes and 50 hours, in the presence of an oxygen containing gas at a flow rate of between 0.001 and 10 l/h/gm.

5. A process according to claim 1 wherein, during step b, said support is calcined at a temperature of between 100° C. and 350° C.

6. A process according to claim 5, wherein said calcining is carried out at a temperature of between 170° C. and 330° C.

7. A process according to claim 1 wherein, during step b, the duration of the calcining is between a few minutes and 8 hours.

8. A process according to claim 2 wherein step c, is carried out at a temperature of between 450° C. and 550° C.

9. A process according to claim 2 wherein the sulfur oxides formed in the calcination of step c are reduced transforming the major portion of the oxides of sulphur which they contain to form sulphur.

* * * * *